United States Patent [19]

Crew et al.

[11] Patent Number: 4,692,299

[45] Date of Patent: Sep. 8, 1987

[54] TESTING SENSOR SIGNAL PROCESSORS

[75] Inventors: Albert W. Crew; William D. Ghrist, III, both of Pittsburgh; Gilbert W. Remley, Blawnox, all of Pa.

[73] Assignee: Westinghouse Electric Corp., Pittsburgh, Pa.

[21] Appl. No.: 788,983

[22] Filed: Oct. 18, 1985

[51] Int. Cl.$^4$ .............................................. G21C 7/36
[52] U.S. Cl. .................... 376/216; 376/217; 376/259; 364/553; 364/550; 364/492
[58] Field of Search ............... 376/216 X, 215, 217 X, 376/259 X; 364/553, 550 X, 527, 492

[56] References Cited

U.S. PATENT DOCUMENTS

| | | | |
|---|---|---|---|
| 3,643,073 | 2/1972 | Sawamura | 364/553 |
| 4,067,060 | 1/1978 | Poussart | 364/553 |
| 4,315,319 | 2/1982 | White | 364/553 |
| 4,328,552 | 5/1982 | Stovall | 364/553 |
| 4,434,132 | 2/1984 | Cook | 376/259 |
| 4,451,878 | 5/1984 | Shijemasa | 364/553 |

OTHER PUBLICATIONS

Resar 414; Westinghouse Nuclear Energy Systems, Amendment 6, Jul. 1977; Amendment 15, Jun. 1978 and Amendments #1 & 2, Dec. 76 & Feb. 77.

Primary Examiner—Donald P. Walsh
Attorney, Agent, or Firm—Daniel C. Abeles

[57] ABSTRACT

A signal processor which applies non-linear dynamic compensation to an applied analog signal is tested by applying to a reference ramp signal compensation having a transfer function equal to the inverse of the transfer function of the signal processor. This test signal is applied to the signal processor in place of the sensor signal so that after the compensation of the processor is applied to it, the resultant signal should match the reference signal. When the signal processing is carried out digitally in a microcomputer and the response to the test signal is multiplexed back to the tester along with response signals from other microcomputers, variable time skewing of the returned test signal is eliminated by feeding the reference signal through a processing path parallel to that of the test signal and then comparing those two signals in the tester. The reference signal is also used in the microcomputer to continually generate a dummy actuation signal which provides a continuous check on microcomputer operation.

11 Claims, 3 Drawing Figures

TESTING SENSOR SIGNAL PROCESSORS

CROSS-REFERENCES TO RELATED APPLICATIONS

Commonly owned U.S. patent application ser. No. 666,696 filed Oct. 31, 1984.

Commonly owned U.S. patent application entitled "Analog Process Control System Testing" filed concurrently herewith in the names of Michael D. Coradi and Carl A. Vitalbo.

BACKGROUND OF THE INVENTION

1. Field of the Invention

This invention is directed to a method and apparatus for testing sensor signal processors and more particularly to such processors which apply dynamic compensation to the sensor signal. It has particularly application to multichannel process control systems and especially such systems in which the sensor signals are processed digitally in a number of microprocessors.

2. Prior Art.

It is common practice in the process control art to monitor a large number of process parameters with sensors that generate analog signals. Typically, initial processing in the form of, for instance, surge protection, buffering, conversion to the appropriate range, and, where required, electrical isolation, is applied to each of the sensor signals. Additional processing in many instances requires the application of dynamic compensation, such as a lead-lag function, to some of the sensor signals. Where the signals are processed by analog circuitry, the dynamic compensation is applied by passing the signals through networks which implement the appropriate transfer function. In digital processing, the appropriate transfer function is implemented through the software.

The processed signals are typically used for process monitoring and/or control, and in some instances for the initiation of automatic protection functions. An application where the sensor signals are used for all three functions is a nuclear reactor. For the protection function in such installations, the sensor signals, with or without dynamic compensation, are further processed by comparing them with set point values to generate actuation signals which effect automatic responses, such as shutting down the reactor or implementing engineered safeguard functions, should prescribed limits be approached or exceeded. prescribed limits be approached or exceeded.

It is common practice for protection systems to have redundant sensors for the monitored parameters arranged for processing in independent channel sets in order to assure reliability. To reduce spurious actuations actuations and therefore improve plant availability, correlation between signals produced by the redundant sensors is required to initiate the automatic response. In such an arrangement, the separate channel sets generate partial actuation signals which are voted, using for instance two out of four voting logic, to generate the actuation signal which effects the response.

Regulations require that the protect system be tested regularly. Typically, the protection functions are tested one channel at a time by substituting a test signal for the sensor signal which results in the generation of a partial actuation signal in the channel under test. Thus, in the two out of four voted protection system, a failure in just one other channel set can result in unnecessary initiation of the automatic response. U.S. Pat. No. 4,434,132 discloses a protection system using microprocessors in the voting logic in which a bypass generated for the function under test is transmitted to the microprocessors in the other channels which then adjust their voting logic to two out of three of the remaining channels.

Under present practice, protection system processors incorporating non-linear compensation are tested manually by turning down all the time constants to zero and then increasing the magnitude of a test signal until the bistable output changes levels. While this procedure provides a continuity test through the compensation channel and a good test of the bistable, it clearly does not provide a full test of the signal processor.

An additional difficulty in microprocessor based systems in which test response signals generated in microprocessors in the signal processing channels are multiplexed back to an independent microprocessor in the tester, is time skewing. If the delay in receipt by the tester of the response to test signals were constant, time skewing could be eliminated merely by applying a constant delay factor. However, since the test microprocessor operates independently of each of the various microprocessors, and the response signals are multiplexed back to the test unit, there is no direct time correlation between the signals sent by the test unit and the responses received.

It is therefore a primary object of the present invention to provide a method and apparatus for fully and accurately testing signal processors which apply non-linear compensation to the applied signal.

It is also an important object of the invention to provide such a method and apparatus for testing signal processors wherein the processor includes a microprocessor in which said non-linear compensation is applied.

It is another object of the invention to provide such a method and apparatus for sequentially testing signal processing channels in a plurality of microprocessors and wherein the responses to test signals are multiplexed back to the tester.

It is yet another object of the invention to continually check each signal processing microprocessor in addition to the specific testing of each processing testing of each processing channel.

SUMMARY OF THE INVENTION

These and other objects are realized by a method and apparatus for testing signal processors, which apply dynamic compensation characterized by a non-linear transfer function to a sensor signal, by generating in a test unit a dynamic reference signal, preferably a ramp signal, and applying to this reference signal dynamic compensation, characterized by a non-linear transfer function which is the inverse of the transfer function of the signal processor, to generate a test signal. By applying the test signal to the signal processor in place of the sensor signal and hence applying the dynamic compensation of the signal processor to it, a compensated test signal is generated. This compensated test signal is transmitted to the test unit for comparison with the reference signal. Since the transfer function used to generate the test signal from the reference signal is the inverse of the transfer function applied to the test signal by the signal processor under test, the compensated test signal should match the reference signal within prescribed tolerances if all the components are working properly.

Since the compensated test signal matches the reference signal, it can be used to provide an accurate test of the generation of an accuation signal by the bistable output of a signal processor in a process protection system. By using a ramp function as the reference signal, the bistable function will change states when the ramp signal represented by the compensated test signal reaches the bistable set point value. Thus a single test signal provides an accurate test of both the non-linear compensation and the bistable function in the signal processor.

These techniques are applicable to both analog and digital signal processors. In the case of digital signal processors in which the compensated test signal is multiplexed back to the test microprocessor, additional steps must be taken to overcome the variable time skewing problem referred to above. In accordance with the teachings of the invention, this is accomplished by injecting the reference signal generated by the tester and from which the test signal is derived, into a path parallel to the test signal. Thus the reference signal is converted to an analog signal and applied to the signal microprocessor where it is converted into a regenerated digital reference signal in a second parallel processing channel. Both the regenerated, digital reference signal and the compensated test signal are multiplexed back to the tester where they are compared. Since both signals are subjected to the same variable delays, the difficulties created by unpredictable time skewing are eliminated.

The reference signal which is processed in a second processing channel of the signal processor microprocessor can be used for continual on-line testing of the microprocessor. This is accomplished by utilizing the reference signal to generate a "dummy" actuation signal in the second processing channel. This "dummy" actuation signal is transmitted back to the tester to verify operation of the microprocessor. Since this test does not require removal of a sensor signal, it can be run continually to provide a gross indication that the microprocessor is functioning.

The invention has particular applicaiton to a multichannel protection system for the control of complex processes such as nuclear reactors, and particularly to such protection systems utilizing numerous microprocessors to provide distributed processing of redundant protection functions.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
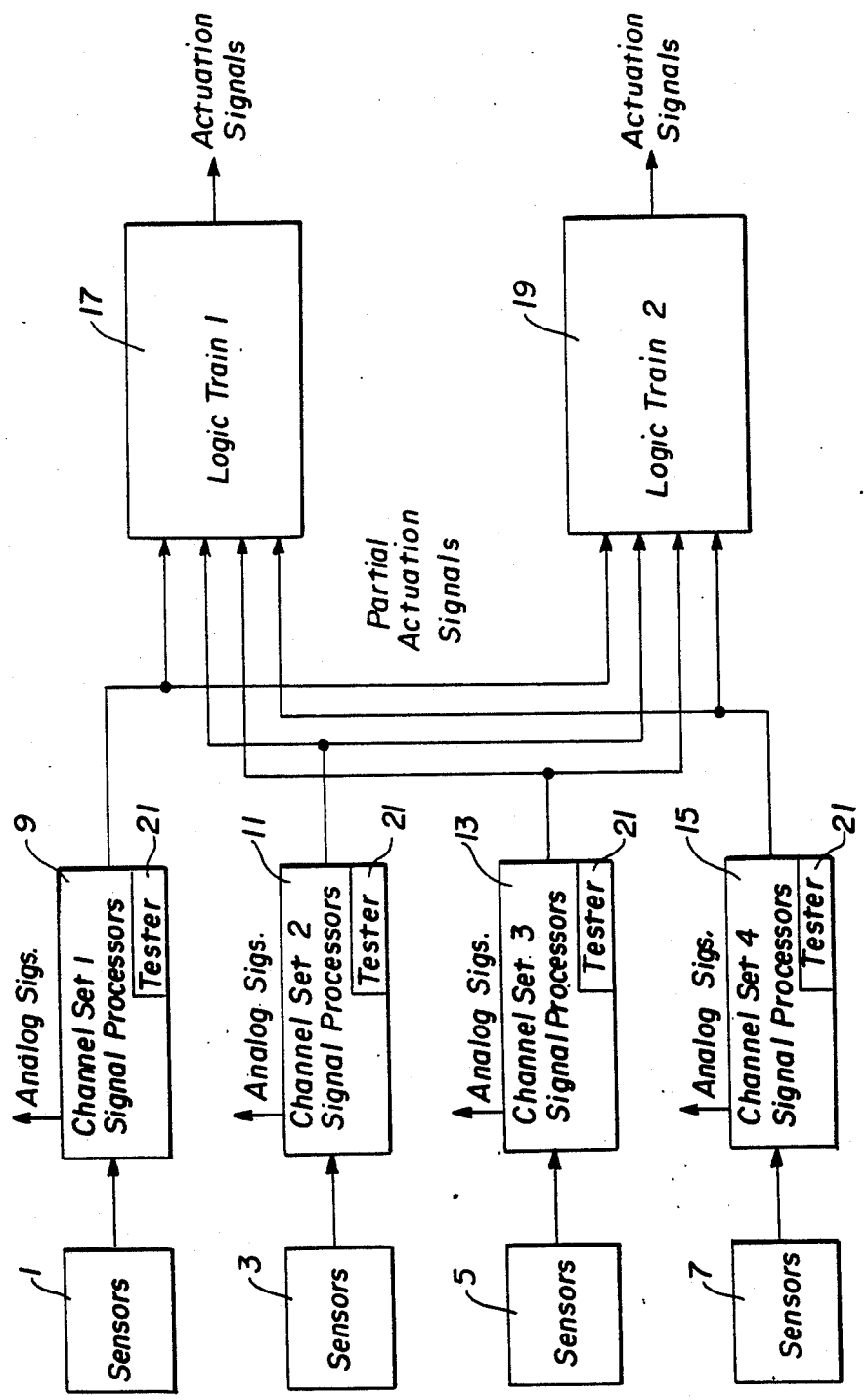
FIG. 1 is a schematic diagram in block diagram form of a multichannel, voted logic protection system for a nuclear reactor to which the invention is applied.

The invention will be described as applied to a distributed microprocessor based multichannel protection system for a nuclear reactor, and in particular a pressurized water reactor (PWR). However, it is to be realized that the invention is applicable to other signal processors, analog as well as digital, which apply dynamic compensation to analog signals. As shown in FIG. 1, the protection system includes redundant groups of sensors, for example four, identified generally by the reference characters 1, 3, 5 and 7 which monitor selected parameters including temperatures, pressures, flows, fluid levels, radiation levels, et cetera, throughout the plant in a manner well known in the art. Each group of sensors 1, 3, 5 and 7 generates analog signals which are processed by associated signal processors 9, 11, 13 and 15 respectively. The sensors and associated signal processors form channel sets which are labeled numerically 1 through 4 in the example.

Processing of the sensor signals by the associated signal processors 9, 11, 13 and 15 of each channel set includes a comparison of the value of the signal with one or more selected limiting values. For each limiting value which is exceeded, a digital partial actuation signal is generated. The partial actuation signals generated by each channel set are each applied to two identical logic trains 17 and 19 which individually generate protection system actuation signals based upon selected voting logic. For instance, if two out of four voting logic has been selected, two out of the corresponding four partial actuation signals must be present in order to generate the actuation signal. These protection system actuation signals include trip signals which open the breakers supplying power to the reactor rod control system to shut down the reactor, and engineered safeguard actuation signals which initiate such action as activating the emergency boron injection system, turning on the containment spray, et cetera, as conditions warrant. The voting logic, the tripping of the reactor, and the operation of the engineered safeguard systems are well-known in the art.

The signal processors 9, 11, 13 and 15 also generate a number of redundant signals representative of the on-line analog value of selected process parameters. These signals may be used by the reactor control system to regulate plant operation, by the surveillance system to monitor plant operation, and, if provided, by a post accident monitoring system to apprise supervisory personnel of the condition of the plant and the effect of mitigating actions taken following an accident. A selected set of the analog value signals may be used for one or more of these purposes, or the four sets of signals can be further processed to generate a mean value, or a most reliable value, using known techniques which are independent of the present invention.

Each of the signal processors 9, 11, 13 and 15 also includes its own automatic tester 21. These testers not only perform tests on the individual signal processors in the channel set, as will be explained below, but they also perform data acquisition functions which also will be more fully discussed.

Figure 2:
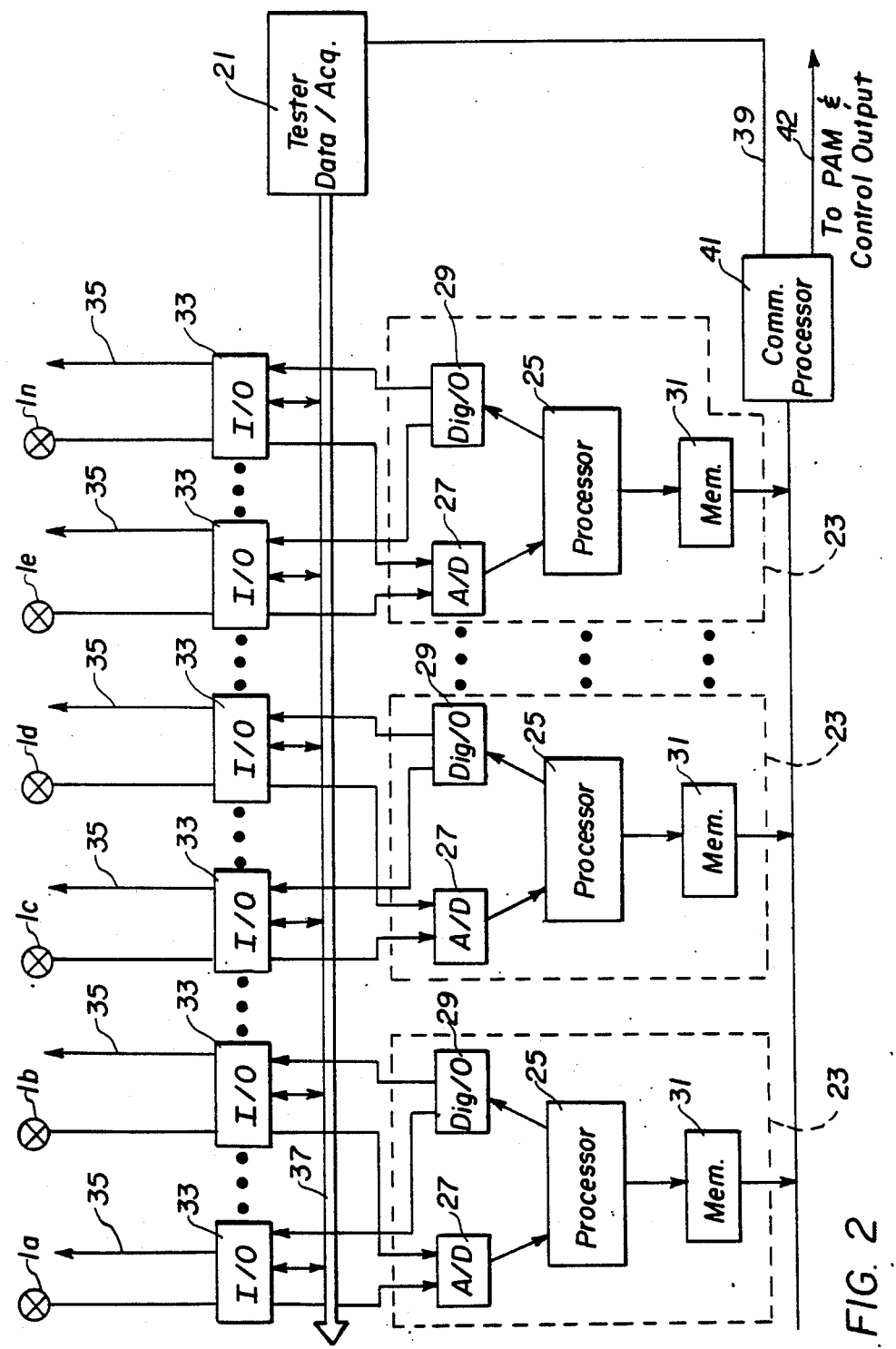
FIG. 2 is a schematic diagram in block diagram form of a portion of one of the channel set of the multichannel protection system of FIG. 1.

FIG. 2 illustrates a portion of the signal processor in channel set 1 and is typical of the signal processors in each channel set. The signal processor includes a number of independent loop microcomputers 23, each of which includes a processor 25, an analog to digital input device 27, a digital output interface 29, and a memory 31. A suitable microcomputer is the Intel SBC 88/40 with an Intel SBC 337 math comprocessor. This combination provides a complete computer system on a single 6.75 by 12 inch printed circuit board. The board provides an iAPX 88/20 microprocessor/coprocessor combination, 16 differential analog inputs, three timers, 24 lines of parallel I/O, $E^2$ PROM support, and a kilobyte of dual ported RAM.

Associated with each microcomputer 23 are a number of input/output boards 33 to which the signals from the sensors 1 are applied, and from which extend output lines 35 over which the partial actuation signals are transmitted to the voting logic. These input/output boards provide some initial processing for the sensor signals such as surge protection, buffering and isolation. Each input/output board 33 is connected to the tester/data acquisition unit 21 by a signal injection and response (SIR) bus 37. The SIR bus 37 includes a number of lines over which any one of a plurality of analog test signals generated by the tester can be applied to a particular microcomputer during testing, a real time response line over which partial actuation signals generated during testing are transmitted back to the tester 21, and control lines over which the tester sends commands to the input/output board. These commands include signals which disconnect selected sensor signals from the microcomputer and replace them with an analog test signal. Other signals transfer the associated digital output of the microcomputer from an output line 35 to the real time response line, and preferably, replace it on the line 35 with a signal representative of the normal, unactuated state of the digital output.

The sensor signals or test signals, as selected by the tester, applied to each microcomputer 23 are further processed such as by converting them to engineering units, adjusting their range, and in some instances, applying dynamic compensation to them including compensation characterized by a non-linear transfer function such as for example, a lead-lag function. In some cases, two or more sensor signals are used to calculate a parameter from the measured parameters. An example of this would be the departure from nucleate boiling ratio (DNBR). In any event, the processed parameter signal is ultimately compared with one or more set point values to generate a digital partial actuation output signal which is sent through the input/output board to the voting logic over a line 35, or during test, is sent over the real time response line of the SIR bus to the tester 21.

The various intermediate signals generated in the microprocessor during the course of generating the digital output signal are stored in the memories 31. These signals which are analog values expressed in digital form represent the measured or calculated value of the associated parameter. The parameter signals stored in the memory of each microcomputer are multiplexed to the tester/data acquisition unit 21 over a data link 39 under the control of a communications processor 41 which sequentially accesses each memory unit. The tester/data acquisition unit not only uses the data for test verification, but also stores it for transmission over a data link (not shown) to the surveillance system. The communications processor 41 also controls the sequential transmission by other data links 42 of the parameter values from the microcomputer memories 31 to the reactor control system (not shown) and to the post accident monitoring (PAM) system (also not shown).

Since the processing performed on the sensor signals is not very extensive, it is possible that one microcomputer 23 could perform all the required processing for a channel set. However, as explained in detail in U.S. patent application Ser. No. 666,696 filed on October 31, 1984, it is preferred that the processing be distributed over a number of independent microcomputers for availability. It is not necessary to provide a separate microcomputer for each protection function, however, it is desirable to have sufficient distribution of the processing load so that failure of any one unit does not unacceptably degrade the system. In assigning protecion functions to the various microcomputers, those which provide independent indications of a specific abnormal condition are processed in different microcomputers. For instance, a break in a reactor coolant line will be manifested by a loss of pressurized pressure and also will result in an increase in reactor coolant temperature. Thus, by processing the pressure and the temperature signals in separate microcomputers, this condition will be recognized despite the loss of one of these processors.

Automatic testing is carried out by the tester unit 21 which periodically, sequentially sends a signal to the input/output board of each microcomputer to remove the sensor signals for the function under test and replace them with the appropriate test signals. It also removes the associated digital output signals generated by the microcomputers from the lines 35 and connects them to the real-time response line. Preferably, a signal having a level representative of the normal state of the output is injected into the output lines in place of the digital output signals. The test signals are programmed to generate an actuation signal for the protection function which is transmitted over the SIR bus to the tester 21 where the actuation and response time are verified according to established standards. The intermediate signals generated in the microcomputer by the test signal are stored in the memory 31 for serial transmission to the tester for verification over the data link bus 39 when so directed by the communication processor 41.

Upon completion of the test of each protection function, the tester 21 disconnects the test signals from the microcomputer and reapplies the appropriate sensor signals. The tester verifies this by increasing the test signal to an extreme value and monitoring the outputs to assure that the sensor signals have in fact replaced the test signals. Following this, the digital output signals are reconnected to the lines 35 and the normal value output signals generated during test are removed. The tester repeats this test sequence for each protection function carried out by each microprocessor. Such automatic testing can be carried out rapidly and therefore can be repeated often to assure the integrity of the protection system.

Figure 3:
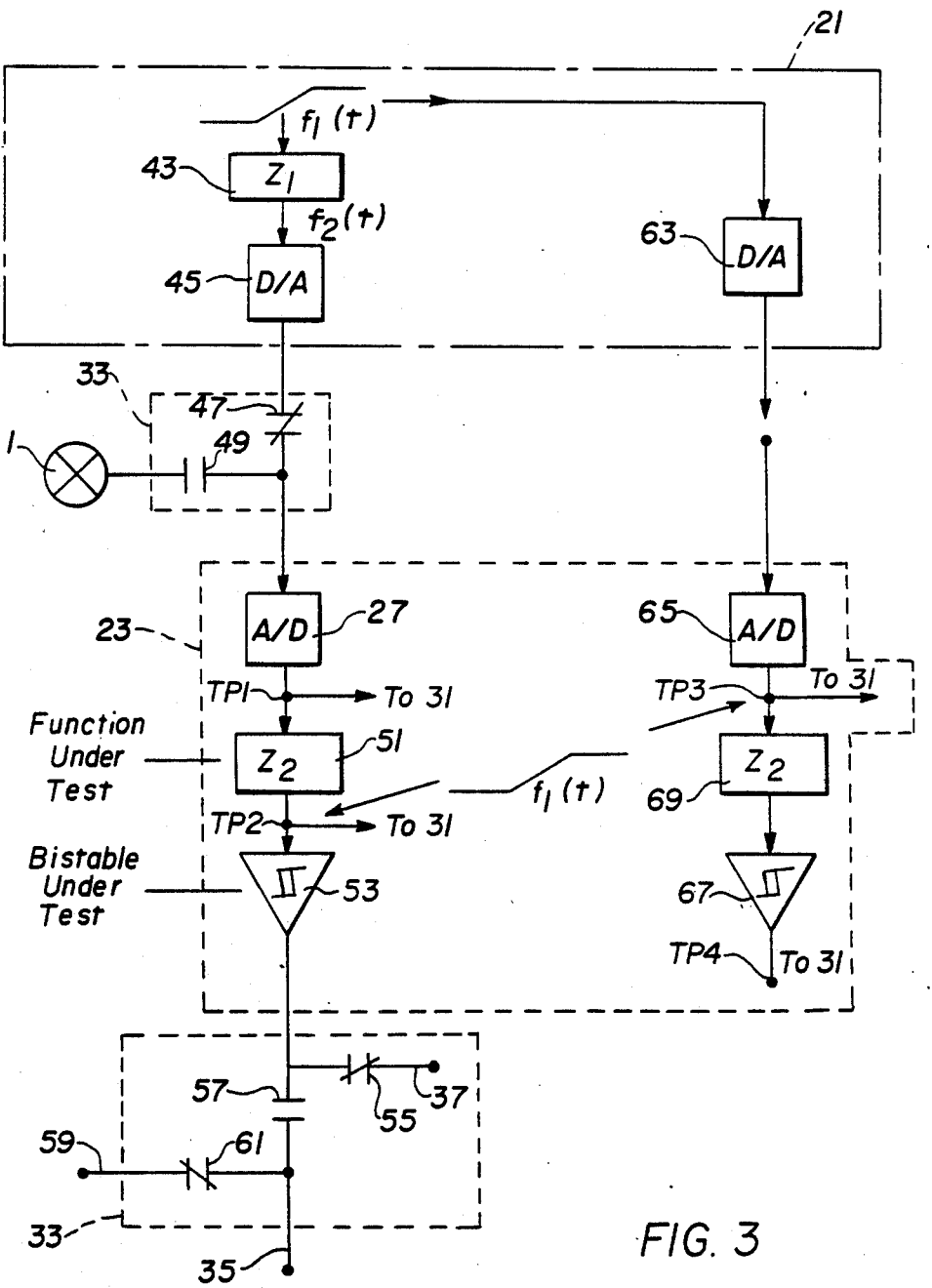
FIG. 3 is a functional diagram illustrating the operation of the channel set of FIG. 2 in accordance with the teachings of the invention.

As mentioned earlier, dynamic compensation with a non-linear transfer function creates special problems in testing a signal processor. FIG. 3 illustrates functionally however the present invention overcomes these difficulties. The tester 21 generates a dynamic reference signal such as the ramp signal $f_1(t)$ as it normally would for testing a bistable function. Dynamic compensation, characterized by a non-linear transfer function $Z_1$, which is the inverse of the non-linear transfer function $Z_2$ under test in the microprocessor, is applied to the ramp signal as indicated at 43 to generate a test signal $f_2(t)$. By way of example, the inverse of a lead-lag function is generated by using the lead time constant of the first function as the lag time constant of the second, the lag time constant of the first as the lead time constant of the second, and one over the gain of the first as the gain of the inverse function.

The digital test signal generated by the tester 21 is converted to an analog signal as at 45 and is applied to the loop microprocesor 23 through contacts 47 of an injection relay on input/output board 33 while contacts 49 disconnect the signal from the associated sensor 1. The A/D converter 27 in the microprocessor converts the test signal back to a digital signal to which the non-linear transfer function $Z_2$ under test is applied as at 51. Since the transfer function $Z_2$ is the inverse of the function $Z_1$, the compensated test signal appearing at the first point $TP^2$ should match the reference signal. Both the digital test signal appearing at $TP^1$ and the compensated digital test signal appearing at $TP^2$ are transmitted to the microcomputer memory 31 for multiplexing back to the tester for verification. The compensated test signal or ramp signal at $TP^2$ is also used to test the bistable function as at 53. With the system in the test mode, contacts 55 on the input/output board 33 apply the actuation signal generated to the real-time response line of the SIR bus 37 for transmission back to the tester where the actuation and response time are verified. As discussed, the digital output is removed from the digital output line by switch 57, and preferably, replaced by a normal level signal generated on line 59 and applied to output line 35 through switch 31.

While FIG. 3 illustrates the procedure for testing a processing path in a digital system, it will be clear to someone skilled in the art how a similar procedure can be applied to an analog processor. However, the digital system described generates a special problem since the compensated test signal generated at $TP^2$ is not returned to the tester over the real-time response line, which is dedicated to the actuation signal, but instead is stored in the memory 31 for multiplexing to the tester over data link 39. If the delay in the transmission of the compensated test signal to the tester were constant, adjustment could easily be made for the fixed phase shift. However, since the microcomputers in the tester, the signal processor and the multiplexer all operate independently, there is no fixed time delay between when the test signal is sent out by the tester and when the response is received. While the variation in the time delay only amounts to a few hundred milliseconds, the strict tolerances imposed by the tester on the response signal will not accommodate even this small variation.

In accordance with the invention, this uncertain time skewing is eliminated by injecting the reference signal into a processing path which exposes it to the same variable delay in time as the test signal experiences. Thus, as illustrated in FIG. 3, the reference signal $f_1(t)$ is converted to an analog signal as at 63 and applied to the microprocessor 23 in a second processing channel parallel to that in which the test signal is processed. It is reconverted as at 65 in this second processing channel into a regenerated, digital reference signal which appears at test point $TP^3$. This signal should match the compensated test signal at $TP^2$ and is sent to the memory 31 for multiplexing back to the tester 21, where the two signals are compared. Since both signals have both been subjected to the same time delays it does not matter that such delays are not constant.

It has been found that applications of the reference signal to the signal processing microcomputer can not only be used as described above to eliminate variable time skewing of the test signal, but can also be utilized to perform a continuous check on the operation of the microcomputer. Thus, the regenerated, digital reference signal is applied to a bistable function as at 67 to generate a "dummy" partial actuation signal at test point $TP^4$ when its value exceeds the set point of the bistable function. This partial actuation signal is referred to as a "dummy" or digital reference output signal since it is not an operative signal used to initiate a protection function but is sent to the memory 31 for transmission back to the tester. If desired, dynamic compensation, such as the transfer function $Z_2$ can be applied to the regenerated, digital reference signal as at 69 for a more complete check of the microcomputer. The variable time delay resulting from multiplexing the "dummy" 0 actuation signal from the memory 31 to the tester 21 is of no consequence since the test is only a check of the operation of the microcomputer 23 and not the accuracy of the bistable function so that the tolerances can be loose enough to accommodate this condition.

Since this "dummy" processing channel does not interfere with signal processing by the microcomputer, it can be used during normal operation of the system to assure that the microcomputer is operating. In this regard, the reference signal can be applied continuously as another analog input signal to all of the signal processing microcomputers in the channel set.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of testing sensor signal processing apparatus which applies dynamic compensation defined by a predetermined non-linear transfer function to the sensor signal to generate a compensated signal and generates a digital output signal having a first level when the magnitude of the compensated signal is less than a set point value and a second level when it equals or exceeds the set point value, said method comprising the steps of:
generating a dynamic reference signal;
generating a test signal by applying to the dynamic reference signal, dynamic compensation defined by the inverse of the non-linear transfer function of the processing apparatus;
removing the sensor signal from the processing apparatus and applying in its place the test signal; and
comparing the compensated signal generated by the processing means with said dynamic reference signal.

2. The method of claim 1 wherein the step of generating a dynamic reference signal comprises generating a ramp signal.

3. The method of claim 2 including monitoring said output signal for transfer from said second level to said first level when said reference signal reaches a value corresponding to said set point value of the compensated signal.

4. The method of claim 2 wherein said signal processing apparatus includes a microprocessor for digitally processing said sensor signal in a first processing channel to generate said compensated signal and said output signal, wherein said dynamic reference signal and said test signal are generated in digital form in a second microprocessor independent of said first microprocessor and converted to analog signals, and wherein said analog test signal is applied to said first microprocessor in place of the sensor signal for processing in said first processing channel to generate a digital compensated signal, said method including the steps of applying said analog reference signal to said first microprocessor, processing the same to generate a regenerated digital reference signal in a second processing channel within the first microprocessor and multiplexing the digital compensated signal generated in the first processing channel of the first microprocessor and the regenerated digital reference signal from the second processing channel to the second microprocessor, and wherein said comparison step comprises comparing in said second microprocessor the digital compensated signal and the regenerated digital reference signal received back from the first microprocessor.

5. The method of claim 4 wherein said step of generating a dynamic reference signal in the second microprocessor comprises repetitively digitally generating a ramp signal, and converting the same to an analog signal, wherein said analog ramp signal is continuously applied to the first microprocessor, wherein processing of said ramp signal in the second channel of the first microprocessor includes generating a digital reference output signal having a first signal level when the ramp signal is less than a predetermined value and a second signal level when it equals or exceeds the predetermined value, and including the steps of applying the digital reference output signal to the second microprocessor, and monitoring in the second microprocessor the level of said digital reference output signal for a change in signal level within a preset time of when the ramp signal reaches a selected test value.

6. Apparatus for testing a signal processor having means for applying dynamic compensation characterized by a non-linear transfer function to an applied analog signal to generate a compensated signal, said test apparatus comprising:
a test unit having means for generating a dynamic reference signal and applying to the reference signal dynamic compensation characterized by a non-linear transfer function which is the inverse of the transfer function of the signal processing apparatus to generate a test signal;
means for applying the test signal to the signal processing apparatus in place of the sensor signal; and
means for returning the compensated signal generated by the signal processor in response to the test signal to the test unit, said test unit including means for comparing the test generated compensated signal with said reference signal.

7. The test apparatus of claim 6 wherein said test unit generates a ramp reference signal and wherein said signal processor generates a digital output signal having a first level when the compensated signal generated in response to the ramp signal has a magnitude less than a predetermined value and having a second level otherwise, and said apparatus including a real-time response line for transmitting the digital output signal to the test unit, said test unit including means for determining that said output signal changes levels within a preselected time of said ramp signal reaching a present value.

8. A process control system comprising:
a sensor for generating an analog sensor signal representative of the real-time measured value of a selected process variable;
a signal processor to which said sensor signal is applied and including a first microprocessor programmed to convert the analog sensor signal to a digital sensor signal and to apply thereto dynamic compensation characterized by a non-linear transfer function to generate a digital, compensated sensor signal in a first processing channel;
a test unit including a second microprocessor programmed to generate a dynamic reference signal and to generate a test signal by applying to said reference signal dynamic compensation characterized by a non-linear transfer function which is the inverse of the transfer function applied by the first microprocessor to the sensor signal;
means for converting said test signal and dynamic reference signal generated in said second microprocessor to analog signals;
means for applying the analog test signal to said first microprocessor in place of said sensor signal to generate in said first processing channel a digital, compensated test signal and for applying said analog reference signal to said first microprocessor to generate in a second processing channel a regenerated digital reference signal; and
a multiplexer for multiplexing said digital compensated test signal and said digital regenerated reference signal to said second microprocessor of said test unit, said second microprocessor being programmed to compare said digital compensated test signal with said digital regenerated reference signal and to generate an alarm signal when they differ by more than preestablished limits.

9. A protection system for a nuclear power plant comprising:
a plurality of sensors for generating redundant sets of sensor signals representative of the measured value of selected plant parameters;
multiple channel sets for separately processing each set of redundant sensor signals and each including a plurality of independent loop microprocessors for processing selected sensor signals in the channel set to generate actuation signals having a first signal level when the magnitude of the associated sensor signal is less than a preset value and having a second level otherwise, at least some of said loop microprocessors being programmed to process selected sensor signals by applying thereto dynamic compensation characterized by a non-linear transfer function to generate a compensated sensor signal which is then used to generate said actuation signal;
a test unit including a test microprocessor programmed to generate test signals for each loop microprocessor including, for each said at least some loop microprocessors, generating a reference ramp signal and applying dynamic compensation characterized by a transfer function which is the inverse of the transfer function applied by that loop processor to the associated sensor signal to generate a dynamic test signal,
means for converting said test signals including said dynamic test signals and said ramp reference signals to analog signals,
input/output means for sequentially applying said analog test signals to said loop microprocessors in place of the associated sensor signals including applying to said at least some loop microprocessors in turn said dynamic test signal to generate in said first processing channel a compensated test signal and said reference ramp signal to generate in a second processing channel a regenerated digital reference ramp signal, and a multiplexer for sequentially transmitting said compensated test signals and regenerated reference ramp signals from said at least some loop microprocessors to said test microprocessor, said test microprocessor being programmed to compare associated compensated test signals and regenerated ramp signals and to generate an alarm when they differ by preestablished criteria.

10. The protection system of claim 9 including a real-time response bus connecting said test unit with each of said input/output means and wherein said input/output means includes output lines and means for applying each actuation signal generated by the associated loop microprocessor in response to a sensor signal to an output line, means for removing the actuation signal from the associated output line and applying it instead to the real-time response bus when the associated sensor signal is replaced by a test signal, and means for generating a first level signal on the output line from which the actuation signal has been removed.

11. The protection system of claim 10 wherein said test unit continuously repetitively generates said reference ramp signal, said converter means continuously converts the reference ramp signal to an analog signal, the input/output means applies the analog reference ramp signal to each loop microprocessor continuously, each loop microprocessor is programmed to repetitively generate a dummy actuation signal having a first signal level when the reference ramp signal has a magnitude less than a present value and a second level otherwise, and said multiplexer sequentially transmits the dummy actuation signal from the loop microprocessors back to the test unit for verification.

* * * * *